United States Patent
Horovitz et al.

(10) Patent No.: US 9,669,312 B2
(45) Date of Patent: *Jun. 6, 2017

(54) SYSTEM AND METHOD FOR OBJECT EXTRACTION

(71) Applicant: EYECUE VISION TECHNOLOGIES LTD., Yokneam (IL)

(72) Inventors: Ronen Horovitz, Zichron-Yaakov (IL); Ran Kaftory, Kiryat Tivon (IL)

(73) Assignee: EYECUE VISION TECHNOLOGIES LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,168

(22) Filed: Apr. 18, 2016

(65) Prior Publication Data

US 2016/0228772 A1 Aug. 11, 2016

Related U.S. Application Data

(63) Continuation of application No. 14/335,986, filed on Jul. 21, 2014, now Pat. No. 9,409,084, which is a
(Continued)

(51) Int. Cl.

| | |
|---|---|
| *A63F 13/00* | (2014.01) |
| *A63F 13/06* | (2006.01) |
| *G06K 9/00* | (2006.01) |
| *A63F 13/655* | (2014.01) |
| *A63F 13/213* | (2014.01) |
| *A63F 13/63* | (2014.01) |
| *A63F 13/20* | (2014.01) |
| *G06T 11/60* | (2006.01) |
| *G06K 9/62* | (2006.01) |

(52) U.S. Cl.
CPC ............ *A63F 13/655* (2014.09); *A63F 13/00* (2013.01); *A63F 13/06* (2013.01); *A63F 13/213* (2014.09);
(Continued)

(58) Field of Classification Search
USPC ............................................. 348/143; 363/61
See application file for complete search history.

(56) References Cited

U.S. PATENT DOCUMENTS

| | | | |
|---|---|---|---|
| 3,904,207 A | 9/1975 | Gold | |
| 4,275,449 A | 6/1981 | Aish et al. | |

(Continued)

FOREIGN PATENT DOCUMENTS

| | | |
|---|---|---|
| JP | 09-102042 | 4/1997 |
| JP | 11-104357 | 4/1999 |

(Continued)

OTHER PUBLICATIONS

USPTO, Non-Final Office Action dated Oct. 2, 2015 in U.S. Appl. No. 14/726,689.

(Continued)

*Primary Examiner* — Reza Aghevli
(74) *Attorney, Agent, or Firm* — Siritzky Law, PLLC

(57) ABSTRACT

Systems and methods for extracting an image of a physical object constructed of for example bricks are presented. The method and system may detect boundaries and edges of a background using an edge detection operator, perform a perspective transformation calculation to compute a corrected virtual grid that is substantially aligned with the physical object's image, locate a color calibration palette in the digital image and extract color value information for pixels of the color calibration palette, and discern bricks as part of the physical object's image, the discernment being based in part on a determination of the brick's color compared to the color palette and the background color, the discerned bricks forming the extracted image. A computer readable medium may include instructions causing a system to extract an image of a physical object constructed of bricks according to the method.

17 Claims, 12 Drawing Sheets

Related U.S. Application Data continuation of application No. 13/960,866, filed on Aug. 7, 2013, which is a continuation of application No. 13/201,512, filed as application No. PCT/US2010/044343 on Aug. 4, 2010, now Pat. No. 9,498,721.

(60) Provisional application No. 61/231,216, filed on Aug. 4, 2009.

(51) Int. Cl.
(52) U.S. Cl.
    CPC ............... *A63F 13/63* (2014.09); *G06K 9/00* (2013.01); *G06K 9/6202* (2013.01); *G06T 11/60* (2013.01); *A63F 2300/1093* (2013.01); *A63F 2300/6018* (2013.01); *A63F 2300/61* (2013.01); *A63F 2300/69* (2013.01)

(56) References Cited

U.S. PATENT DOCUMENTS

| | | | |
|---|---|---|---|
| 5,168,531 A | 12/1992 | Sigel | |
| 5,687,333 A | 11/1997 | Dobashi | |
| 5,855,483 A | 1/1999 | Collins et al. | |
| 5,900,863 A | 5/1999 | Numazaki | |
| 6,049,281 A | 4/2000 | Osterweil | |
| 6,115,482 A | 9/2000 | Sears | |
| 6,208,347 B1* | 3/2001 | Migdal | G06T 17/20 345/419 |
| 6,259,815 B1 | 7/2001 | Anderson et al. | |
| 6,290,565 B1 | 9/2001 | Galyean, III et al. | |
| 6,351,265 B1 | 2/2002 | Bullman | |
| 6,378,867 B1 | 4/2002 | Shalless | |
| 6,422,561 B1 | 7/2002 | Schroeder | |
| 6,466,205 B2 | 10/2002 | Simpson et al. | |
| 6,690,156 B1 | 2/2004 | Weiner et al. | |
| 6,741,245 B1 | 5/2004 | Marks et al. | |
| 6,745,236 B1 | 6/2004 | Hawkins et al. | |
| 6,967,566 B2 | 11/2005 | Weston et al. | |
| 7,051,935 B2 | 5/2006 | Sali et al. | |
| 7,389,002 B1 | 6/2008 | Knight | |
| 7,439,972 B2 | 10/2008 | Timcenko | |
| 7,486,841 B2 | 2/2009 | Gallant | |
| 7,515,734 B2 | 4/2009 | Horovitz et al. | |
| 7,644,926 B2 | 1/2010 | Teeple | |
| 7,720,257 B2 | 5/2010 | Morellas et al. | |
| 7,942,717 B2 | 5/2011 | Chou et al. | |
| 8,070,163 B2 | 12/2011 | Ogilvie | |
| 8,126,264 B2 | 2/2012 | Kaftory et al. | |
| 8,144,121 B2 | 3/2012 | Kitaura | |
| 8,167,721 B2 | 5/2012 | Fujisawa | |
| 8,277,316 B2* | 10/2012 | Haigh-Hutchinson | A63F 13/426 463/30 |
| 8,482,534 B2 | 7/2013 | Pryor | |
| 8,576,199 B1 | 11/2013 | Pryor | |
| 9,061,196 B2 | 6/2015 | Kingsley | |
| 9,095,768 B1 | 8/2015 | Bohadi | |
| 2002/0114491 A1 | 8/2002 | Sharma | |
| 2002/0196250 A1 | 12/2002 | Anderson et al. | |
| 2003/0058238 A1 | 3/2003 | Doak et al. | |
| 2004/0263510 A1* | 12/2004 | Marschner | G06T 13/40 345/419 |
| 2005/0111757 A1 | 5/2005 | Brackett et al. | |
| 2005/0195317 A1 | 9/2005 | Myoga | |
| 2005/0244072 A1 | 11/2005 | Imai | |
| 2005/0276448 A1 | 12/2005 | Pryor | |
| 2006/0013441 A1 | 1/2006 | Onuma et al. | |
| 2006/0056732 A1 | 3/2006 | Holmes | |
| 2006/0083423 A1 | 4/2006 | Brown et al. | |
| 2006/0125691 A1 | 6/2006 | Menache et al. | |
| 2006/0136180 A1 | 6/2006 | Hansen et al. | |
| 2006/0202953 A1 | 9/2006 | Pryor et al. | |
| 2006/0223637 A1* | 10/2006 | Rosenberg | A63F 13/10 463/47 |
| 2006/0249530 A1 | 11/2006 | Ho | |
| 2006/0252475 A1* | 11/2006 | Zalewski | A63F 13/02 463/1 |
| 2006/0258446 A1 | 11/2006 | Nguyen et al. | |
| 2007/0016790 A1 | 1/2007 | Brundage et al. | |
| 2007/0019808 A1 | 1/2007 | Gonzalez | |
| 2007/0063997 A1 | 3/2007 | Scherer et al. | |
| 2007/0070038 A1 | 3/2007 | Hoffberg et al. | |
| 2007/0158434 A1 | 7/2007 | Fan | |
| 2007/0262984 A1 | 11/2007 | Pruss | |
| 2007/0274563 A1 | 11/2007 | Jung et al. | |
| 2008/0004093 A1 | 1/2008 | Van Luchene et al. | |
| 2008/0125896 A1 | 5/2008 | Troy et al. | |
| 2008/0192129 A1 | 8/2008 | Walker | |
| 2008/0219654 A1 | 9/2008 | Border et al. | |
| 2008/0231611 A1 | 9/2008 | Bathiche et al. | |
| 2008/0260244 A1 | 10/2008 | Kaftory et al. | |
| 2008/0261693 A1* | 10/2008 | Zalewski | G06F 3/0304 463/31 |
| 2008/0284864 A1 | 11/2008 | Kotake | |
| 2009/0033770 A1 | 2/2009 | Johnson | |
| 2009/0057400 A1 | 3/2009 | Silverbrook et al. | |
| 2009/0074300 A1 | 3/2009 | Hull et al. | |
| 2009/0110239 A1 | 4/2009 | Chen | |
| 2009/0115133 A1 | 5/2009 | Kelly et al. | |
| 2009/0141048 A1 | 6/2009 | Fujimoto et al. | |
| 2009/0148041 A1 | 6/2009 | Piramuthu | |
| 2009/0152357 A1 | 6/2009 | Lei | |
| 2009/0154778 A1 | 6/2009 | Lei | |
| 2009/0180669 A1 | 7/2009 | Horovitz et al. | |
| 2009/0219281 A1* | 9/2009 | Maillot | G06T 15/04 345/419 |
| 2009/0290809 A1 | 11/2009 | Yamada et al. | |
| 2009/0319892 A1 | 12/2009 | Wright et al. | |
| 2010/0062819 A1* | 3/2010 | Hannigan | G06Q 30/02 463/9 |
| 2010/0103132 A1 | 4/2010 | Ikeda | |
| 2010/0317919 A1 | 12/2010 | Takaoka et al. | |
| 2011/0193990 A1 | 8/2011 | Pillman et al. | |
| 2011/0255776 A1* | 10/2011 | Mark | A63F 13/02 382/154 |
| 2011/0298922 A1 | 12/2011 | Horovitz | |
| 2011/0300516 A1 | 12/2011 | Wigdor et al. | |
| 2012/0056992 A1 | 3/2012 | Kuroda | |
| 2012/0199066 A1 | 8/2012 | Hoshino | |
| 2012/0249741 A1 | 10/2012 | Maciocci | |
| 2012/0299876 A1 | 11/2012 | De Leon | |
| 2012/0304059 A1 | 11/2012 | McCloskey et al. | |
| 2013/0110804 A1 | 5/2013 | Davis | |
| 2013/0113888 A1 | 5/2013 | Koguchi | |
| 2013/0190087 A1 | 7/2013 | Somarajapuram | |
| 2013/0217491 A1 | 8/2013 | Hilbert et al. | |
| 2013/0294700 A1 | 11/2013 | Kaftory | |
| 2014/0320668 A1 | 10/2014 | Kalevo | |
| 2015/0117789 A1 | 4/2015 | Miyashita | |
| 2015/0371103 A1 | 12/2015 | Kaftory | |

FOREIGN PATENT DOCUMENTS

| | | |
|---|---|---|
| JP | 2000-271346 | 10/2000 |
| JP | 2005-124133 | 5/2005 |
| JP | 2007-316949 | 12/2007 |
| JP | 2008-210327 | 9/2008 |
| JP | 2008-265169 | 11/2008 |
| WO | WO 2008152644 A3 | 12/2008 |

OTHER PUBLICATIONS

Let's play on a computer Lego block! Japanese Version. Lego Creator Lego Rocco appeared!! ASCII, Jul. 1, 2000, vol. 24, #7, p. 377.

Office Action of Japanese Application No. 2012-523722 issued on Apr. 22, 2014.

United States Office Action of U.S. Appl. No. 13/201,512 dated Oct 24, 2013.

United States Office Action of U.S. Appl. No. 13/201,512 dated Jan. 31, 2014.

(56) References Cited

OTHER PUBLICATIONS

WIPO, International Search Report of Application No. PCT/US2010/044343 dated Sep. 30, 2010.
Office Action of U.S. Appl. No. 13/201,512 dated Nov. 14, 2014.
Notice of Allowance of U.S Appl. No. 14/106,908 dated Nov. 20, 2014.
Final Office Action of U.S. Appl. No. 13/960,866 dated Mar. 30, 2015.
US office action for U.S. Appl. No. 13/960,866 dated Apr. 28, 2016.
WIPO, International Preliminary Report on Patentability Chapter I for PCT/IL2012/00023, Jul. 16, 2013.
WIPO, Written Opinion of the International Search Authority for PCT/IL2012/00023, Jul. 16, 2013.
WIPO, International Search Report for PCT/IL2012/00023, Jul. 19, 2012.
WIPO, International search report for PCT/IL2008/000675, Feb. 25, 2010.
WIPO, International Preliminary Report on Patentability Chapter I for PCT/IL2008/000675, Jan. 19, 2010.
WIPO, Written Opinion of the International Search Authority for PCT/IL2008/000675, Nov. 16, 2009.
WIPO, International Preliminary Report on Patentability Chapter I for PCT/US2010/044343, Feb. 7, 2012.
WIPO, Written Opinion of the International Search Authority for PCT/US2010/044343, Feb. 4, 2012.
WIPO, International Search Report for PCT/US2010/044343, Feb. 10, 2011.
Anderson et al. Tangible Interaction + Graphical Interpretation: A New Approach to 3D Modeling, SIGGRAPH '00 Proceedings of the 27th annual conference on computer graphics and interactive techniques, pp. 393-402.
USPTO Notice of Allowance for U.S. Appl. No. 14/106,908, dated Nov. 20, 2014.
USPTO Office Action for U.S. Appl. No. 13/201,512, dated Nov. 14, 2014.
USPTO Office Action for U.S. Appl. No. 13/201,512, dated Jun. 11, 2015.
USPTO Office Action for U.S. Appl. No. 13/201,512, dated Apr. 20, 2016.
USPTO Office Action for U.S. Appl. No. 14/335,986 ,dated Nov. 19, 2014.
Office Action for U.S. Appl. No. 14/335,986, dated Apr. 16, 2015.
USPTO Office Action of U.S. Appl. No. 13/201,512 dated Oct. 24, 2013.
USPTO Office Action of U.S. Appl. No. 13/201,512 dated Jan. 31, 2014.
USPTO, Non-Final Rejection, Oct. 2, 2015 in U.S. Appl. No. 14/726,689.
United States Office Action of U.S. Appl. No. 13/201,512 dated Oct. 24, 2013.
International Search Report of Application No. PCT/US2010/044343 dated Sep. 30, 2010.
Notice of Allowance of U.S. Appl. No. 14/106,908 dated Nov. 20, 2014.
US office action for U.S. Appl. No. 13/201,512 dated Apr. 20, 2016.
USPTO Final Office Action of U.S. Appl. No. 13/960,866, Mar. 30, 2015.
USPTO, Notice of Allowance, in U.S. Appl. No. 13/201,512, Aug. 31, 2016.
USPTO, Non-Final Rejection, in U.S. Appl. No. 13/201,512, Apr. 20, 2016.
USPTO, Non-Final Rejection, in U.S. Appl. No. 13/201,512, Nov. 14, 2014.
USPTO, Non-Final Rejection, in U.S. Appl. No. 13/201,512, Oct. 24, 2013.
USPTO, Final Rejection, in U.S. Appl. No. 13/201,512, Jun. 11, 2015.
USPTO, Final Rejection, in U.S. Appl. No. 13/201,512, Jan. 31, 2014.
USPTO, Advisory Action, in U.S. Appl. No. 13/201,512, Apr. 16, 2014.
WIPO International Search Report, mailed Sep. 30, 2010 for PCT international Application No. PCT/US2010/044343.
Japanese Patent Office (JPO), Office Action of Japanese Application No. 2012-523722 Issued on Apr. 22, 2014.
Berna Erol, Emilio Antúnez, and Jonathan J. Hull. 2008. Hotpaper: multimedia interaction with paper using mobile phones. In Proceedings of the 16th ACM international conference on Multimedia (MM '08). ACM, New York, NY, USA, 399-408.
Office Action for U.S. Appl. No. 14/335,986 dated Nov. 19, 2014.
Office Action of U.S. Appl. No. 13/960,866 dated Apr. 28, 2016.

\* cited by examiner

SYSTEM AND METHOD FOR OBJECT EXTRACTION

CROSS REFERENCE TO RELATED APPLICATIONS

This application is a continuation of U.S. patent application Ser. No. 14/335,986, filed Jul. 21, 2014, now U.S. Pat. No. 9,409,084, issued Aug. 9, 2016, which is a continuation of U.S. patent application Ser. No. 13/960,866, filed Aug. 7, 2013, which is a continuation of U.S. patent application Ser. No. 13/201,512, filed Aug. 15, 2011, which is a National Phase application of PCT International Application No. PCT/US2010/044343, International Filing Date Aug. 4, 2010, entitled "SYSTEM AND METHOD FOR OBJECT EXTRACTION", which claims the benefit of U.S. Provisional Patent Application No. 61/231,216, filed on Aug. 4, 2009, all of which are incorporated herein by reference in their entirety.

FIELD OF THE INVENTION

This application relates to an interactive computer imaging system and method, and in particular to a system and method for identifying an object extracted from an image.

BACKGROUND

Construction sets may include standardized interlocking pieces that allow for the construction of a variety of different models or shapes. These pieces may not require special training or design time to construct complex systems. Interlocking pieces may be suitable for creating temporary structures for use as a toy for children. One example of an interlocking construction set is LEGO® (LEGO Juris A/S Corporation, Denmark), which can include colorful interlocking plastic bricks and an accompanying array of gears, minifigures and various other parts. These interlocking bricks can be assembled and connected in many ways, to construct such objects as vehicles, buildings, and even working robots. Anything constructed by these interlocking bricks can be taken apart, and the pieces may be used to make other objects.

SUMMARY

An embodiment of the present invention provides a system for extracting an image of a physical object constructed of bricks. The system includes a processor or controller, a digital imaging device coupled to the processor or controller and configured to provide a digital image of the physical object arranged over a background containing a pattern or visual cues, a background detector unit coupled to the controller and configured to detect boundaries and edges of the background in the digital image, a perspective transformation unit coupled to the controller and configured to compute a corrected virtual grid substantially aligned to the physical object's image, a color calibration extraction unit coupled to the controller and configured to locate a color calibration palette in the digital image by sampling associated pixels aligned to the corrected grid, and a brick identifier unit coupled to the controller and configured to discern bricks in the digital image as part of the physical object's image, the discerned bricks forming the extracted image. The various units discussed herein (background detector unit coupled, perspective transformation unit, etc.) may be implemented by the processor or controller, for example by the controller or processor executing instructions or code.

Another embodiment of the present invention provides a method for extracting an image of a physical object constructed of bricks. The method includes obtaining a digital image of the physical object arranged over a background, detecting boundaries and edges of the background using an edge detection operator, wherein a curvature of edges calculated to be 90° or about 90° is an indication of a corner, performing a perspective transformation calculation to compute a corrected virtual grid that is substantially aligned with the physical object's image, locating a color calibration palette in the digital image and extracting color value information for pixels of the color calibration palette, discerning bricks as part of the physical object's image, the discernment being based in part on a determination of the brick's color compared to the color palette and the background color, the discerned bricks forming the extracted image.

Another embodiment of the present invention provides a computer readable program encoded in a computer readable medium (e.g., a memory device, a disk drive). The computer readable program includes an executable computer program code configured to instruct a system to extract an image of a physical object constructed of bricks.

DETAILED DESCRIPTION

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored as instructions or code in an article such as a memory device, where such instructions upon execution by a processor or computer result in the execution of a method of an embodiment of the invention.

This application relates to interactive games and computer vision imaging systems that may extract and identify an object captured in an image. The object may be created by assembling interlocking bricks (e.g., LEGO® bricks or building units) or other pieces or building blocks. In one embodiment, the bricks or construction objects used have or conform to a known set of dimensions (e.g., a known and limited set of shapes and dimensions). The image may be captured in uncontrolled lighting conditions. The identification of the object may be based on shape analysis and/or shape comparison. Identification can be done by recognizing and classifying the object by comparison to a record in a predefined database of objects. By embedding the extracted image of the physical object within an interactive video game, a user may experience a level of interaction with the extracted object.

Figure 1:
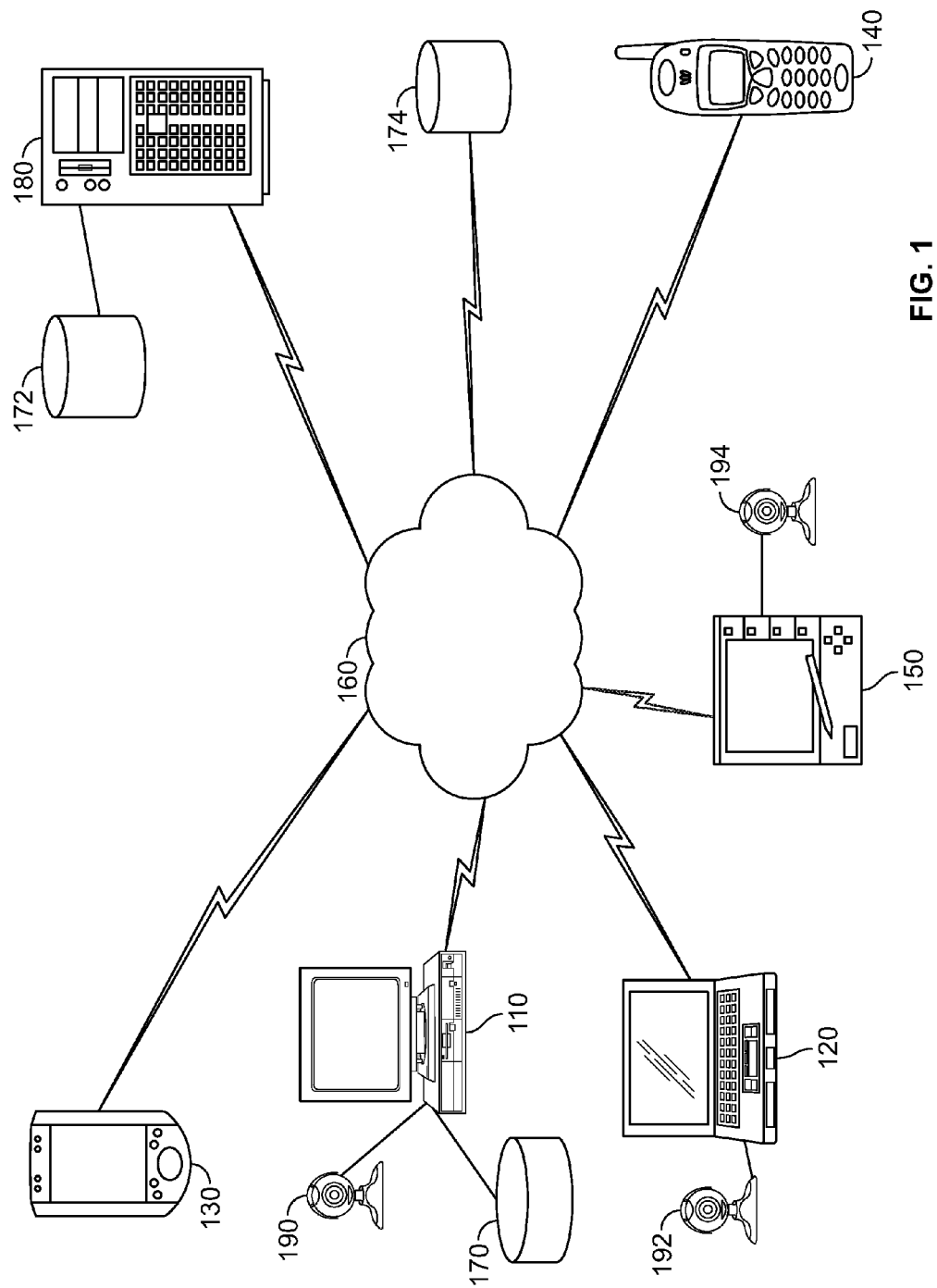
FIG. 1 depicts a schematic diagram of a system in accordance with an embodiment of the invention.
Figure 2:
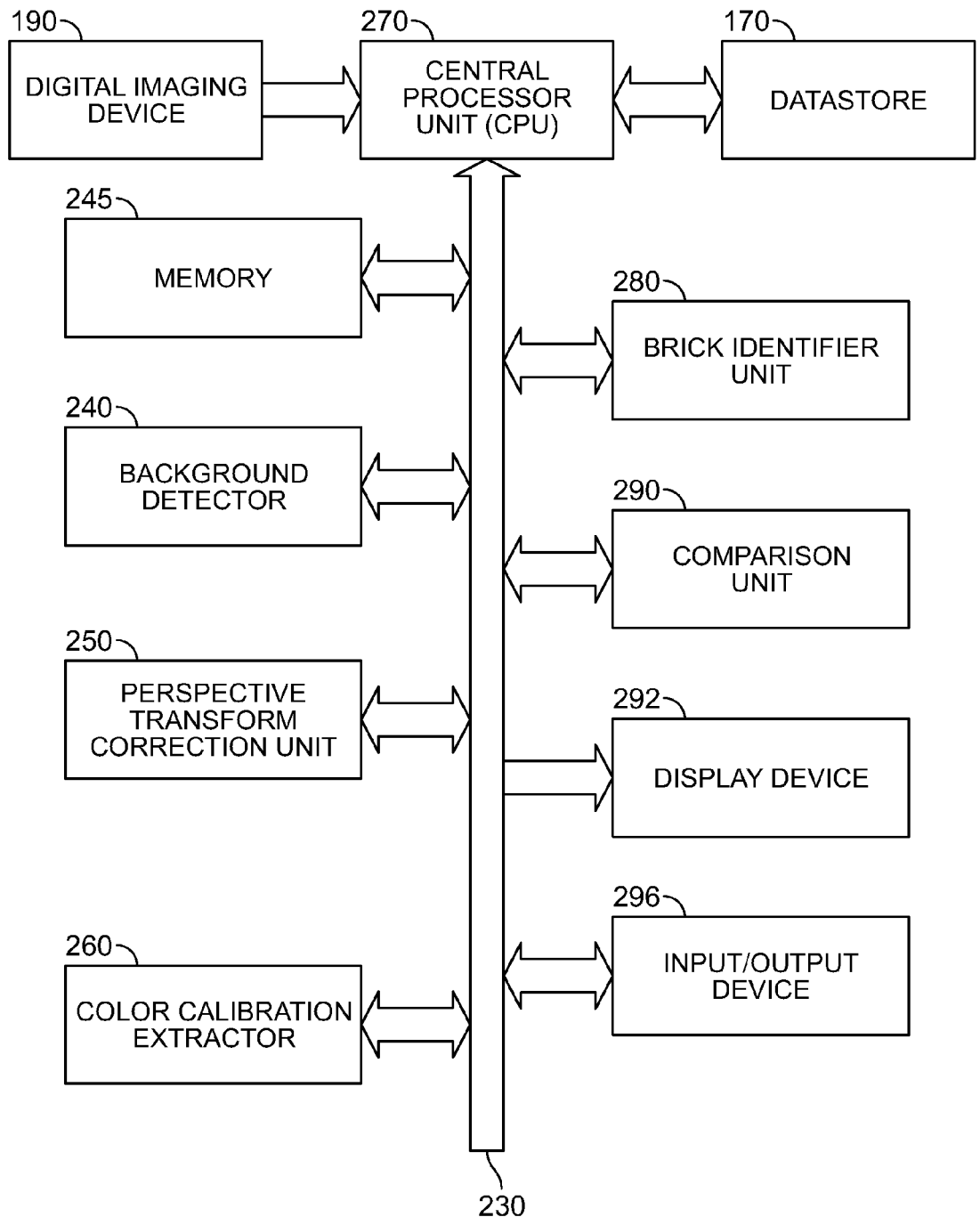
FIG. 2 depicts a schematic diagram of components of the system of FIG. 1.

FIG. 1 is a schematic diagram of system 100 in accordance with an embodiment of the invention. System 100 may include computer such as a workstation or personal computer 110 and digital imaging device 190. Personal computer 110 may include a processor, a display 292 (FIG. 2), a user interface(s) input/output device 296 (FIG. 2) (e.g., keyboard, arrow keys, and/or mouse), and memory 245 (FIG. 2). Digital imaging device 190 may be, by way of example, an imager, a webcam or a digital camera. Connected to personal computer 110 may be datastore 170 containing a database of images, and other data (e.g., software or code). Datastore 170 may be implemented by a memory or another storage device, such as a hard disk drive.

System 100 may be a dedicated, stand-alone device having a processor, a display, a user interface, memory, database, and a digital imaging device. System 100 may be embodied in other computing devices, such as notebook or netbook 120, personal digital assistant (PDA) 130, mobile phone 140, or tablet (pad) computer 150. System 100 may include an integral imaging device in, for example, PDA 130 and mobile phone 140. A digital imaging device 190, 192, 194 may be connected, respectively, to personal computer 110, notebook or netbook 120, and tablet computer 150.

System 100 may include a computer program application stored in non-volatile memory, or computer-readable medium (e.g., hard drive, flash memory, CD ROM, magnetic media, etc.). The computer program application may include code or executable instructions that when executed may instruct or cause the controller or processor of system 100 to perform methods discussed herein such as a method of extracting, identifying, or embedding the object.

In another embodiment, computing device 110, 120, 130, 140, 150 of system 100 may each be configured as client devices connected through electronic communication network 160 to a remote server 180. Electronic communication network 160 may be the Internet, a local area network, a wide area network, or other suitable configurations of an electronic communication network. Client device computing devices 110, 120, 130, 140, 150 may have a local client application, and remote server 180 may include a remote server application. In combination, the client application and remote server application may provide the instructions for system 100 to perform methods discussed herein such as a method of extracting, identifying, and/or embedding the object. A datastore 172 containing a database of images may be connected to remote server 180. In one embodiment, stand-alone datastore 174 containing a database of images may be connected to electronic communication network 160. Datastore 174 may be accessed through electronic communication network 160 by computing devices 110, 120, 130, 140, 150 and/or remote server 180.

System 100 may provide an interactive system that can detect and extract an image of a physical object from an image of a real world scene captured by digital imaging device 190, 192, 194. System 100 may model the extracted object on a computer display for visualization and embedding in a computer video game. The object may be constructed from interlocking bricks, or other items, or other materials. In one embodiment, system 100 may provide instructions to a user on a suggested shape or configuration for the object to be constructed—for example, a plane, an automobile, a house, a character, etc. For example, a processor or controller may select a shape and present the shape on a display possibly along with an instruction to a user to construct the displayed shape from the bricks, so as to create the physical object. The suggested configurations can be stored in, for example, datastores 170, 172, 174. After a suggested object is extracted, system 100 may compare the extracted image to the suggested configuration and may compute a rating or metric that is representative of the comparison results, or of the correspondence between the image of the physical object to the suggested configuration or shape.

FIG. 2 depicts a schematic of components of system 100. System 100 may include controller or central processor unit 270 that may be connected to an internal bus 230. Digital imaging device 190 may be connected to CPU 270 via an input/output port (not shown). Also connected to CPU 270 via an input/output port may be memory or datastore 170. In an alternate embodiment, the shape configurations stored within the datastore may be stored in memory 245 coupled to internal bus 230, thus, reducing the need for datastore 170.

CPU 270 may provide background detector 240 with a digital image provided by the digital imaging device. Background detector 240 may be implemented by dedicated hardware, software modules, and/or firmware, where CPU 270 executes the instructions. Other units discussed herein may also be implemented by dedicated hardware units, software modules, and/or firmware, where CPU 270 executes the instructions. The boundaries and edges of background 220 may be calculated and extracted by background detector 240 using an edge detector process or algorithm. To discriminate background 220 (FIG. 3) from image 205 (FIG. 3) (e.g., a digital image) of a physical object, e.g., made of bricks or other building units, the curvature of the edges may be calculated and locations where the curvature is about 90 degrees may be marked as corners. Each detected corner may be associated with the curvature of edges that are connected to it. The background detector may provide its result to CPU 270 for storage in internal memory 245, or an external memory unit, for example as a record in datastore 170. Background 220 may include a grid, pattern, or visual cues to enable extraction of the image of the physical object. A background need not be used.

Perspective transformation correction (PTC) unit 250 may compute a corrected virtual grid substantially aligned to the image of the object 210. Color calibration extractor unit 260 may use the perspective corrected grid to locate color calibration palette(s) formed on background 220. The color value of the associated pixel from image 205 corresponding to the bricks of the palette may be extracted and converted to another color space representation by the color calibration extractor unit. Also, a few calibration points from the background field of background 220, chosen to represent the field color, may also be extracted and converted to the same HSV (hue, saturation, and value) color space by color calibration extractor unit 260. Other color spaces may be used, and color need not be used.

Brick identifier unit 280 may sample and extract the value of associated pixels of image 205 in a few different places. These values may be converted to for example the HSV color space. The hue value of the converted data may be compared with the hue values of the color calibration palette, and optionally the field of background 220. The color with the smallest difference is chosen by brick identifier unit 280 to represent the color of this grid location. Brick identifier unit 280 compares the intensity and saturation levels of the pixels to determine if the brick is colored, black or white. If the determined color of the brick is not the color of the background, then brick identifier unit 280 discerns that this brick is part of the constructed object.

Comparison unit 290 may compare the shape of the detected image with a record stored in a database. The comparison is done by comparison unit using for example a correlation function.

Figure 3:
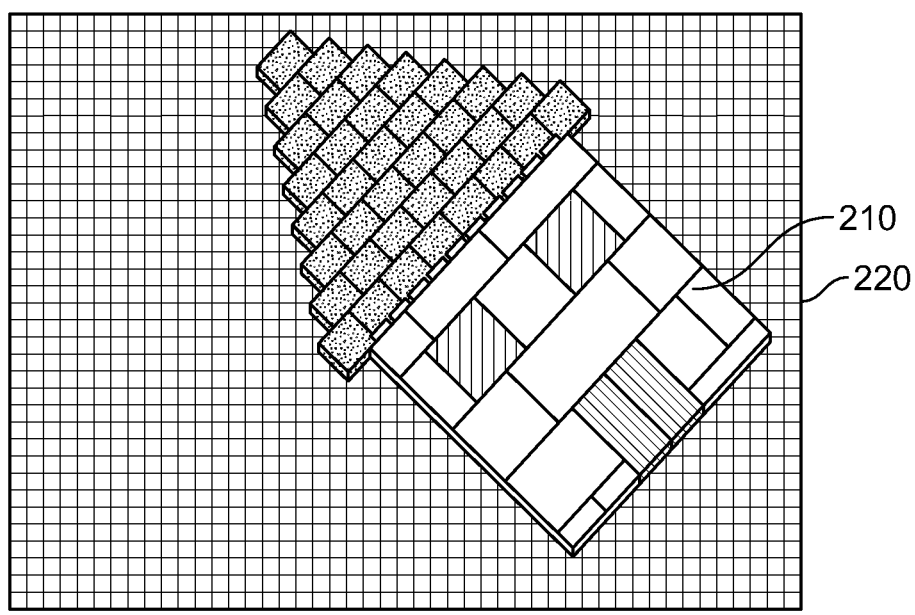
FIG. 3 depicts an image captured by the system depicted in FIG. 1.

FIG. 3 depicts image 205 of object 210 placed on background 220. Object 210 may be a real world, physical object made of building bricks or other units. Similarly, background 220 may be a real-world, physical object made of building bricks or other units, or printed on paper or cardboard. A background need not be used.

The object to be extracted can be captured on a background having a predefined pattern. This predefined pattern may have predetermined known spatial features that can discriminate the pixels belonging to object 210 from the pixels belonging to background 220. For example, FIG. 3 depicts background 220 having a square grid. The spatial pattern of background 220 may be discriminated from pixels of image 205 containing object 210 made from interlocking building bricks, which are typically solid and rigid. The predefined grid need not be a square grid, and other implementations of a predefined background pattern may be used.

With a result similar to the chroma key technique, where foreground objects are separated from a background using a bluescreen or greenscreen, system 100 may extract object 210 from image 205 by using the extracted object's spatial and morphological features, and may be done independent of color recognition.

The captured image containing object 210 may be analyzed to extract the object from background 220. Once extracted, object 210 may be analyzed for shape identification by comparison to a predefined database of objects. Once the shape of object 210 is identified, the digital extracted object can be used in a variety of dynamic interactions with a player.

Figure 4:
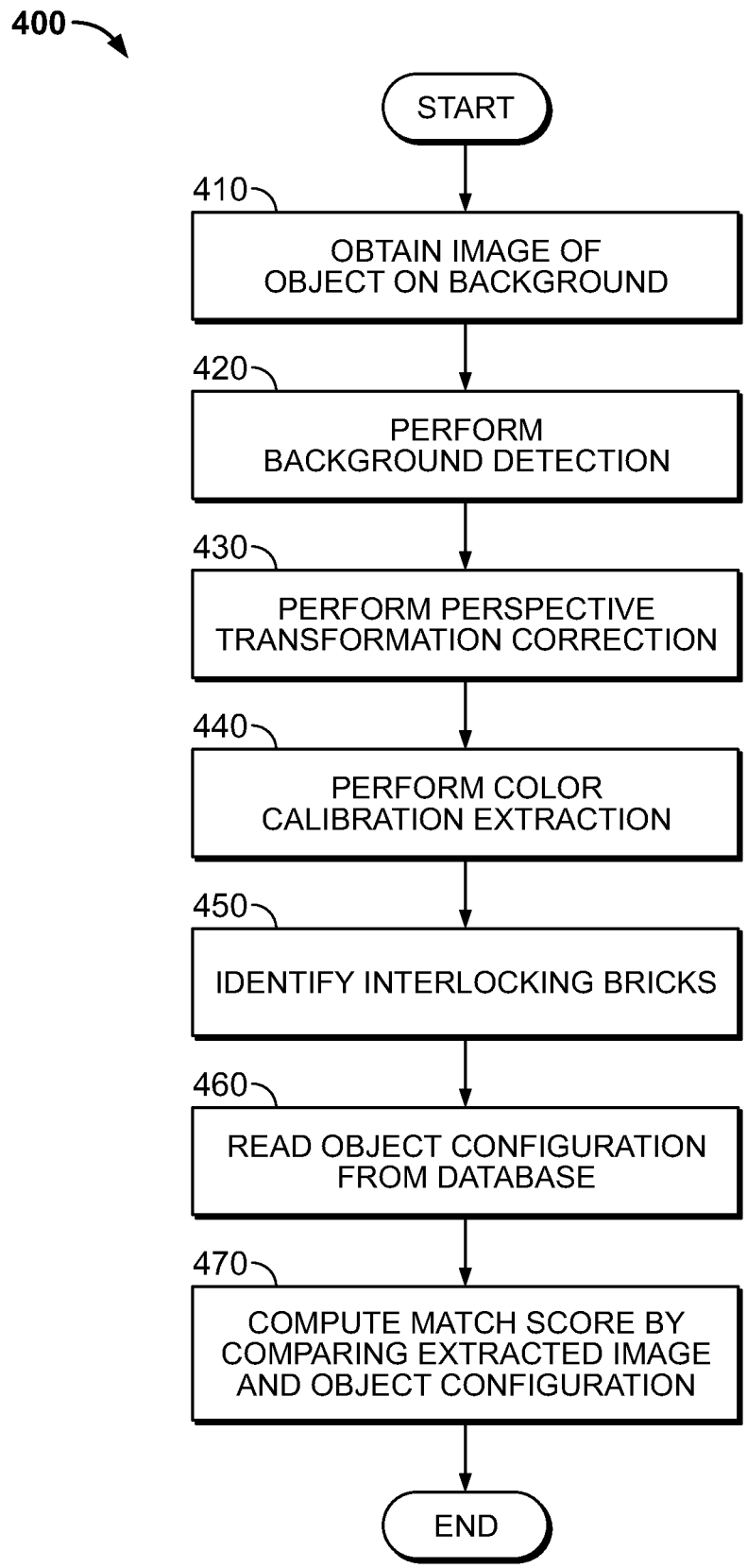
FIG. 4 depicts a method in accordance with an embodiment of the invention.

FIG. 4 depicts process 400 in accordance with an embodiment of the invention. A mask of object 210 may be extracted using a morphological operator such as a 2D bottom hat operator, which may give an image that can then be filtered using a combination of a threshold techniques and other morphological operators (e.g., closing and opening) to remove spurious artifacts. The resultant mask created by applying these morphological operators may represent object 210 detected and isolated from background 220.

In one embodiment, process 400 for extracting and identifying object 210 may be performed as follows:

Image 205 may be obtained, step 410, by arranging object 210 on background 220, and taking a digital image of the arrangement. The image may be taken using digital imaging device 190 connected to computing device 110, a personal computer. Alternatively, the image may be taken using other computing devices, described above, and either external or internal digital imaging devices associated with these other computing devices.

Background Object Detection:

The background object on which the bricks may be placed can be any surface with known features such as a specific color, a specific spatial pattern, or other spectral/spatial feature(s) that may aid in the detection and extraction of the object. Background object 220 may be, for example, a printed paper or cardboard, or a surface formed from interlocking bricks. If for example, an interlocking brick background is used as a background, process 400 may include detecting four high contrast corners, which can be created by using, for example, white perimeter bricks encompassing a dark color field. The corners can be used to find the background field's boundaries in the following way:

The boundaries of the image may be calculated and extracted using any edge detector which can detect edges in images, for example, the Canny algorithm is one such multi-stage algorithm. The Canney algorithm may use an edge detection operator that may include four filters to detect horizontal, vertical and diagonal edges in an image. The edge detection operator may return a value for the first derivative in the horizontal direction and the vertical direction. From these derivatives an edge gradient and direction can be determined. Other non-maximal suppression edge detector techniques may also be used by process 400.

Figure 5:
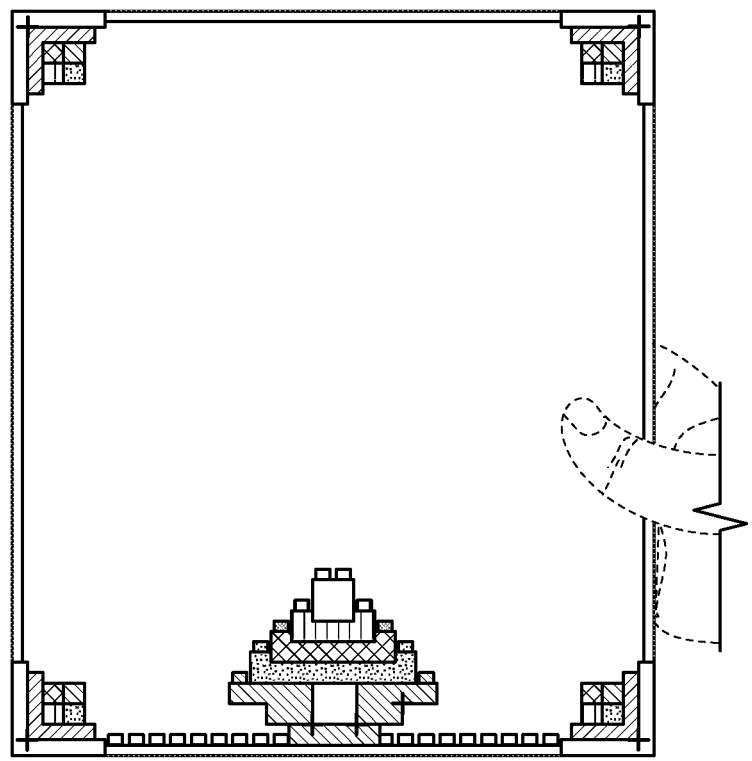
FIG. 5 depicts a representation of an image in accordance with a step of the method depicted in FIG. 4.

To discriminate background 220 from image 205, the curvature of the edges may be calculated and locations where the curvature is about 90 degrees may be marked as corners, step 420. FIG. 5 depicts an interlocking brick background and object with corners identified by process 400 and indicated by a "+" mark in the figure. Each of the marked corners may be considered a candidate corner of the background field.

With reference to FIG. 5, each detected candidate corner may be associated with the curvature of edges that are connected to it. These edge curvatures may be on a straight line if they are found, within a predetermined threshold, to be close to zero. In such a case, the corners may be marked as candidates for being the background field's corners. The slope of each associated edge of the candidate corners is calculated and its line equation is extracted. If the distance between a first candidate corner and one of the line equations associated with a second candidate corner is smaller than some predetermined threshold, then those two corners are accounted as being on the same line. If four such corners are found where the lines form a quadrangle the background field's corners are assumed to be found. A candidate corner that is not on the same line with other corners may be removed from consideration as a background corner.

Figure 6:
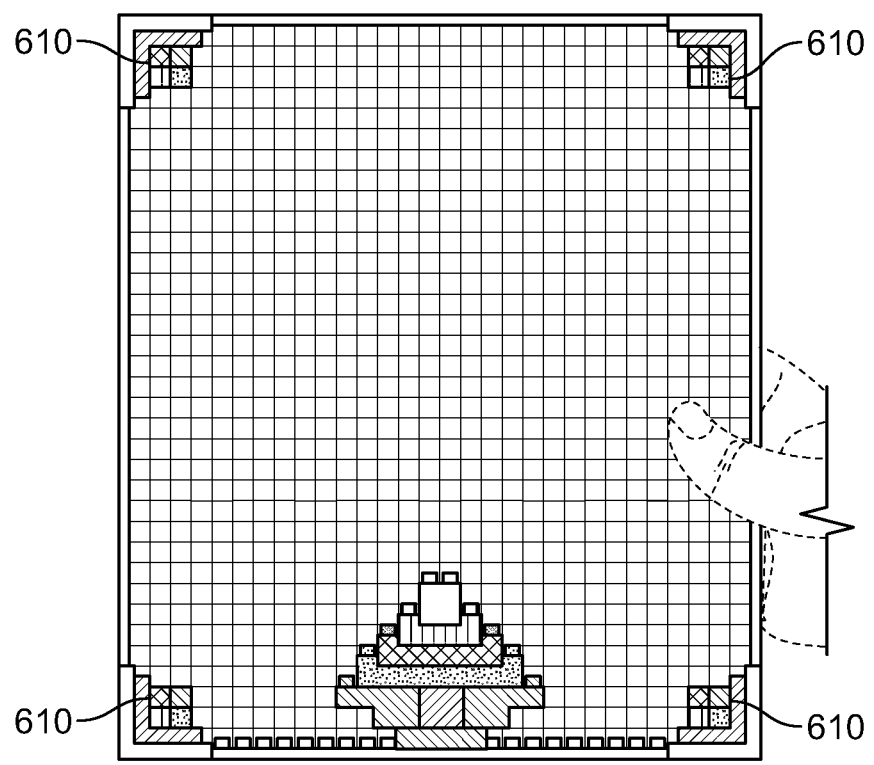
FIG. 6 depicts a representation of another step in the method depicted in FIG. 4.

Perspective Transformation Correction:

Background 220 may be rectangular or square, or other shapes, but due to the fact that the background may not necessarily be orientated perpendicular to the camera lens' axis, the acquired image may not be square and true. The position of the detected corners of background 220 may be used to perform a perspective transformation calculation, step 430. This perspective transformation may be used to compute a corrected virtual grid that is substantially aligned with the image of the interlocking bricks forming object 210 as depicted in image 205. FIG. 6 depicts a representation of image 205 with a superimposed true grid after the perspective transformation calculation.

Figure 7:
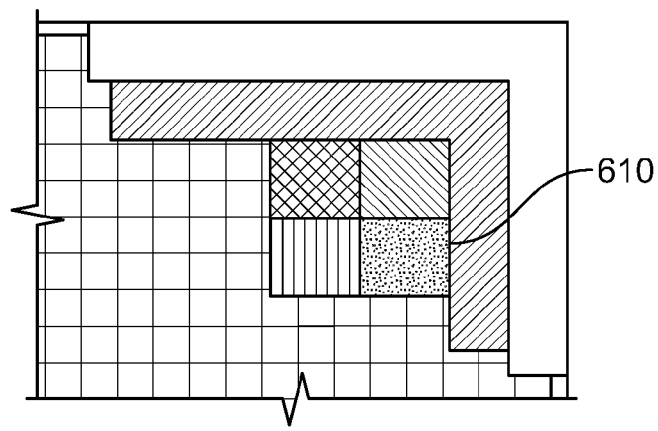
FIG. 7 depicts a close up of a portion of the image of FIG. 5.

Calibration Color Extraction:

FIG. 7 depicts a close up of one corner of background 220 depicting a color calibration palette 610. Background 220 may have color calibration palette 610 located in one or more of its four corners. Each color calibration palette may include, for example, four different colored blocks—e.g., red, yellow, green, and blue. Other numbers of colors and other colors may be used. The colored blocks may be formed, for example, using interlocking bricks when background 220 is assembled.

Using the perspective corrected grid obtained in step 430, the location of each of these colored bricks forming color calibration palette 610 may be found. The color value of the associated pixel from image 205 corresponding to the bricks of the palette may be extracted, step 440, and converted to another color space representation, such as HSV color space. Also, a few calibration points from the background field of background 220, chosen to represent the field color, may also be extracted and converted to the same HSV color space.

Colored building blocks can undergo additional analysis, and classification of their colors to obtain a color model of the object can be made.

Figure 8:
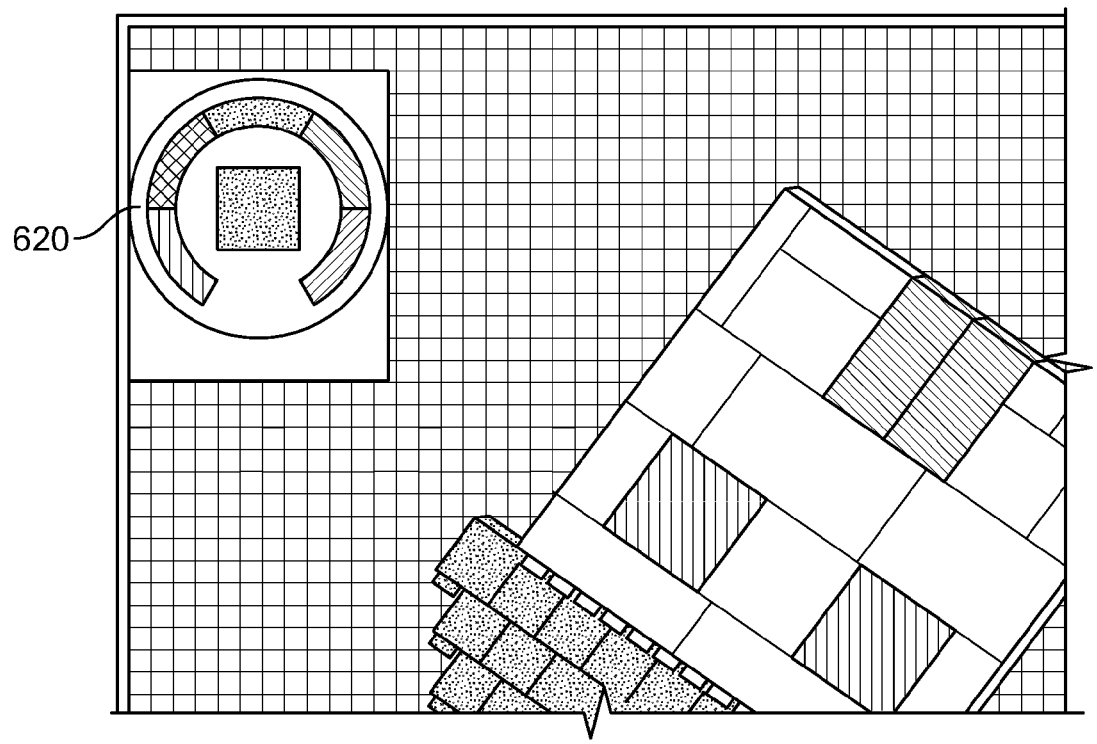
FIG. 8 depicts an alternate embodiment of an element of the image of FIG. 3.

FIG. 8 depicts an alternate embodiment of background 220. In this embodiment, background 220 may be printed on a suitable flat surface and material, such as paper or cardboard. Here, background 220 may include color calibration palette 620 which may include a combination of colors arranged in a specific spatial arrangement. Color calibration palette 620 may allow for the calibration of colors to compensate for white balance, dynamic range and color consistency.

Brick Identification:

For each grid location, the value of the associated pixels of image 205 may be sampled in a few different places and extracted, step 450. These values may be converted to HSV color space. The hue value of the converted data may be compared with the hue values of the color calibration palette, and optionally the background field, obtained during step 440. The color with the smallest difference may be chosen to represent the color of this grid location. The intensity level of the associated pixels may be compared with the intensity level and the saturation level of the black and white pixels associated with the bricks used in the four corners of background 220. If the saturation level is closer to the saturation level of the white color than to the saturation level of the color palette and the background; and if its intensity level is also high, then the color of the grid location may be marked as white. If the intensity level is very low and close to the intensity level of the black color, then the grid location may be marked as black. Otherwise, the color of the grid location is assigned the corresponding color from the color calibration palette.

Figure 9C:
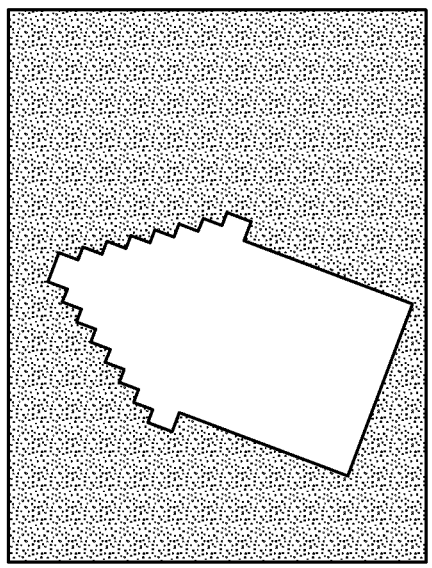
FIGS. 9A-9C depicts a representation of another step in the method depicted in FIG. 4.
Figure 9B:
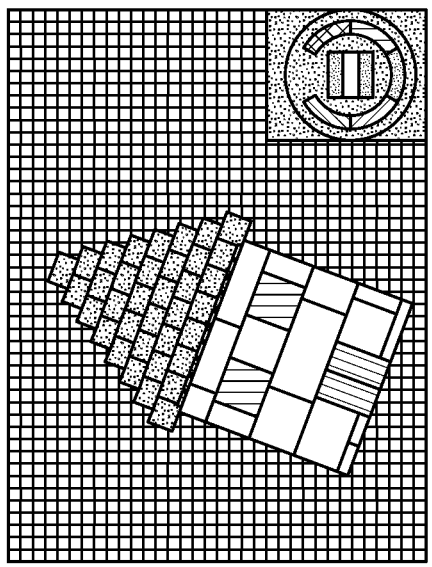
Figure 9A:
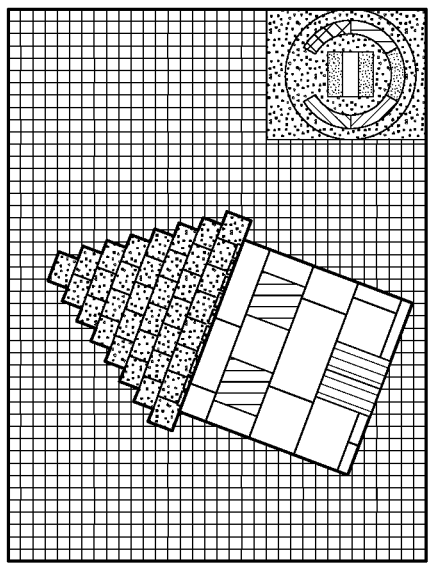
Figure 10:
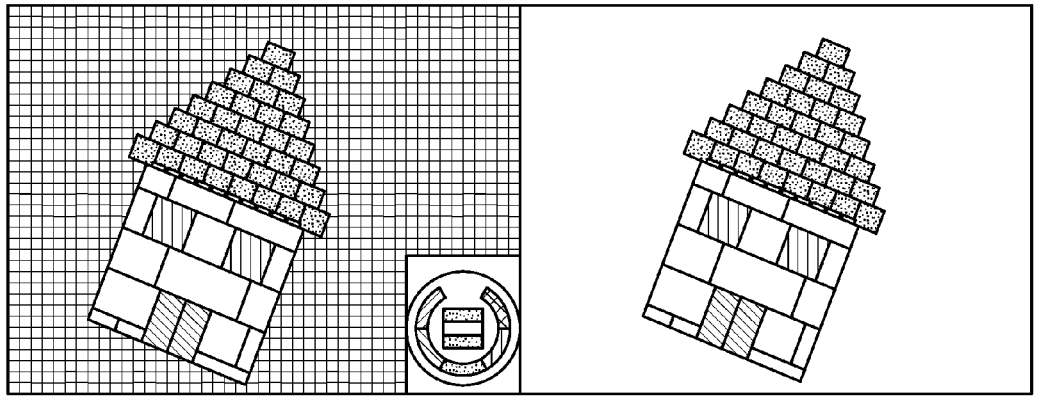
FIG. 10 depicts an extracted image from the image of FIG. 3 in accordance with the method depicted in FIG. 4.

FIGS. 9A-9C depict interim results of step 440. A morphological operator such as a 2D bottom hat operator will give an image (see FIG. 9A) which can then be filtered using one, or more, threshold techniques (see FIG. 9B) and other morphological operators—e.g., closing and opening, to remove spurious artifacts. The resultant mask created by applying these morphological operators may represent object 210 isolated from background 220 (see FIG. 9C). FIG. 10 depicts an example of an image of object 210 after extraction from image 205 by process 400.

After the image of object 210 is separated from background 220 and extracted from image 205, process 400 may perform further analysis of the orientation of the extracted image by applying binary large object (BLOB) analysis, labeling, and moments calculations to obtain a calculated angle that can be used to rotate the object to a more desired angle.

In one embodiment, further analysis of the spatial and spectral features associated with the detected object can be used to train system 100 to recognize the object in the future by, for example, examining the color histogram of the detected object and relations of colored segments within the detected object. This information may be stored in datastore 170, 172, and 174.

Shape Comparison and Scoring:

The shape of the extracted object from image 205 may be compared, steps 460, 470 with a record of a database stored within datastore 170, 172 or 174. The extracted object shape can be compared to the input shape from the database by using, for example, a normalized correlation function, cor:
f(cor)=(stored configuration, extracted shape)
f(cor)=1, if stored configuration=extracted shape
where:
the stored configuration may be within a datastore, and
the extracted shape may be provided, for example, by process 400.

Figure 13A:
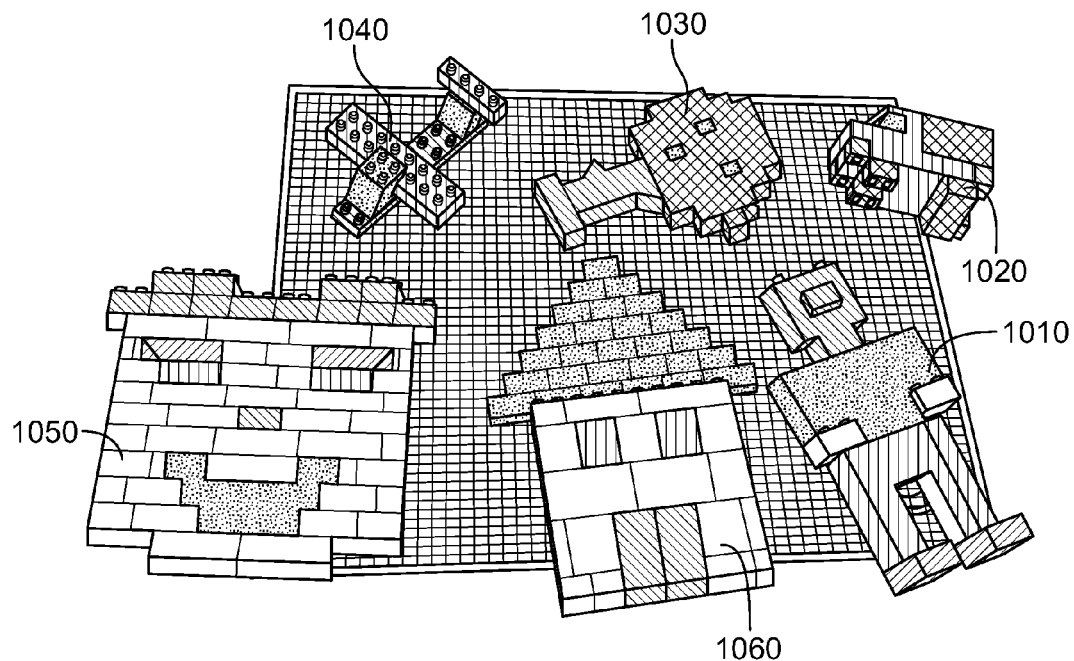
FIG. 13A depicts an assortment of real world objects.

Other operations can be used. In one embodiment, a game can be created based on the extracted image and its classification. The computer may engage the user in an interactive manner to create real world objects which are than provided to the computer in an image for extraction. A computer may present a record from a database on a computer display and ask a player to build the displayed object. The displayed object may be, for example, a car. After the object is assembled by the player, an image of the object placed on a suitable background (as discussed above) can be obtained. The computer may than extract an image of the object, and compare it to the database record. FIG. 13A depicts a variety of objects that can be built. By way of example, FIG. 13A depicts real world objects in the form of character 1010, car 1020, tree 1030, airplane 1040, face 1050, and house 1060. The following text is an example of an interactive script which may be outputted to a user and the corresponding actions in accordance with this embodiment:

Computer: Welcome, players, let's go on a fun storytelling adventure!

Computer: First, we need a character . . . Can you build a boy character?

[Player builds and shows a body of a character on the background]

Computer [after extracting and comparing the object]: Cool, now let's give him a face; can you build a face for him?

[Player builds and shows a face on the background]

Computer: Fantastic . . . mmm . . . Let's build him a house . . . can you help do that?

[Player builds and shows a house on the background]

Computer: That's a really nice house.

Computer: Hey, what's that sound? Is that an airplane? Can you build an airplane?

[Player builds and shows an airplane on the background]

Computer: And what is this sound? Is that a car honking? Let's build one . . .

[Player builds and shows a car on the background]

If showing the wrong thing than computer responds with:

Computer: That's a cool [face/house/airplane/car/tree] but let's try again.

By obtaining an image of the constructed object, the computing device may detect the presence of a shape and extract the shape showing a digital representation of the extracted shape on a display screen. The user can create a virtual world by manipulating the location or other aspects of the digital representation of the shape on the screen.

The extraction can also involve automatic recognition of the shape by using image processing techniques. Using automatic recognition, the computer can ask the user to build a specific shape and may give some feedback based on a comparison with a predefined image in the database.

Figure 11:
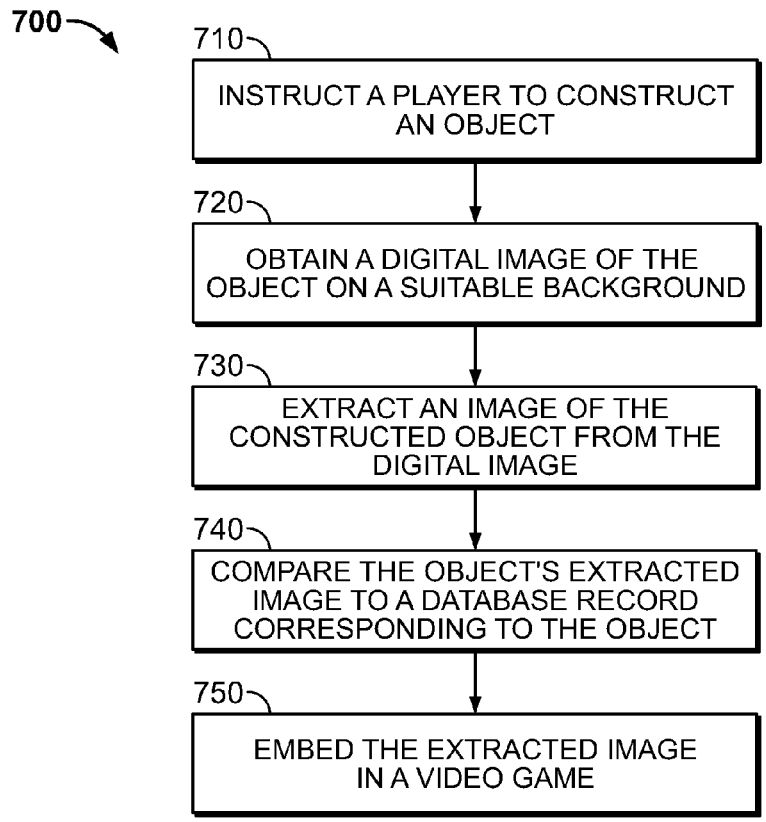
FIG. 11 depicts a method in accordance with an embodiment of the invention.

FIG. 11 depicts process 700 which may implement a game, for example, including interactive script presented above. A computer instructs (e.g., via a display or monitor) a player, step 710, to construct an object. The instruction can be provided, for example, by audio (verbal or sound) through a sound card, or visually by presenting written words on a computer display. An image of the object may or may not be displayed. By not displaying an image of the instructed object, the player's knowledge, word skill, and imagination may be exercised. The object may be chosen at random from a database, or may be chosen in a predetermined sequence. The predetermined sequence may be selected so that the player's construction skills are developed by the sequence of object selection.

After the player constructs the object, the player may place the object on a suitable background, as describe above, and take a digital image of the object and background using a digital imaging device. A background need not be used. The computer obtains, step 720, the digital image of the physical object as an image file from the digital imaging device.

The image of the constructed physical object may be extracted, step 730, from the digital image. The extraction may be performed using, for example, the method of process 400 described above with reference to FIG. 4.

The object's extracted image may be compared to a database record that corresponds to the instructed object, step 740. In one embodiment of the invention, the comparison may provide a rating or metric that may be indicative of the constructed object's conformance with the instructed object.

The extracted image may be embedded, step 750, in a video game and utilized within the game parameters by the player.

Other steps or series of steps may be used.

In another embodiment, the computer may randomly choose a shape (e.g., a predetermined shape taken from a memory or a database) and show or display the shape on the display device. A player may try and construct that shape using bricks or other construction objects, for example, under timed conditions, as part of a game. Once the player finishes constructing the shape, he uses the digital imager to upload an image of his creation to the computer. After the computer extracts and identifies the object, it can be compared to the original shape shown on the device. The result of comparison can be shown to indicate a success or failure in the construction task as part of an interactive competition.

A user may be presented with a selected shape composed from bricks or other building units appearing on the screen of a computing device. This selected shape may also be accompanied by a timer that starts when the user first sees the shape. The timer may be used to measure how fast the user can successfully build the shape using the interlocking bricks.

The user tries to build the shape using regular bricks and may place the object he built on the area designated as the background area, if a background is used. The computing device may constantly analyze images acquired from a digital camera and may detect the presence of an object on the background area.

If an object is detected, an embodiment of the method may extract the shape of the object the user created by using processes in embodiments of the present invention, for example, process 400 described above.

The process may compare the extracted image of the object built by the user to the selected shape that was presented as the target shape to determine how successful the user was in building the shape. The comparison may provide a rating or metric based on how accurate the user's object corresponds to the selected shape. This rating or metric may also include a component indicative of the time spent to construct the object, where the component varies based on the complexity of the object.

Figure 12:
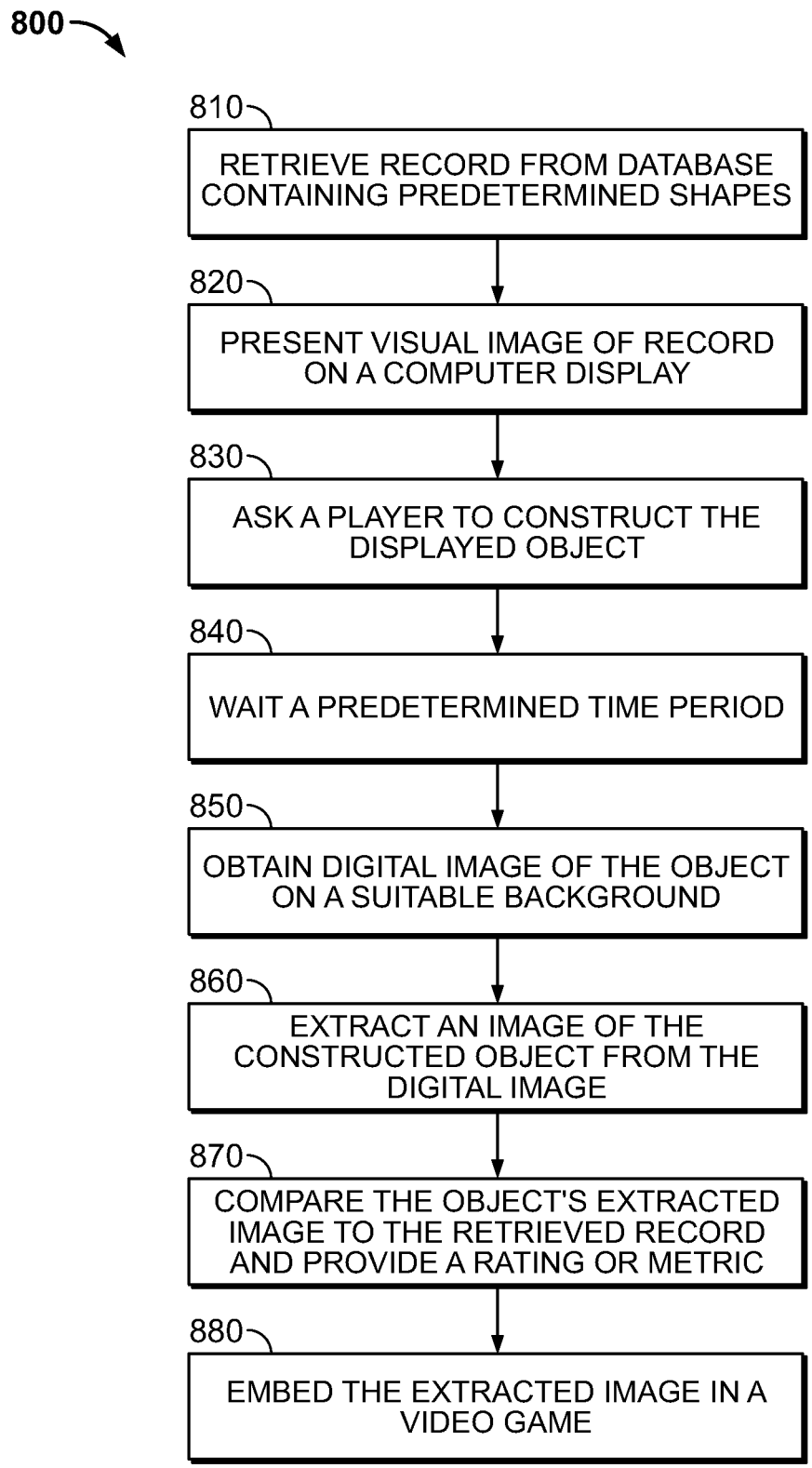
FIG. 12 depicts a method in accordance with an embodiment of the invention.

FIG. 12 depicts process 800 which may implement the timed construction described above. A computer may retrieve a record, step 810, from a database containing records representing predetermined shapes. A visual image of the retrieved shape may be displayed, step 820, on a computer display.

The computer may provide a message requesting, step 830, the player to construct the object seen on the display. Optionally, the computer may also present a clock timer on the screen. The timer (whether displayed or not) may be a count up, or a count down timer so as to track the time elapsed for the user to construct the physical object.

After receiving an indication (e.g., via a user input device) that the user has completed construction, or waiting for a predetermined time period to elapse, step 840, the computer instructs the player to place the object on a suitable background, as describe above, and take a digital image of the object and background using a digital imaging device. A background need not be used. The computer may obtain, step 850, the digital image as an image file from the digital imaging device.

The image of the constructed object may be extracted, step 860, from the digital image. The extraction may be performed using, for example, the method of process 400 described above with reference to FIG. 4.

The object's extracted image may be compared to the retrieved database record, step 870. The comparison may provide a rating or metric that may be indicative of the constructed object's conformance with the retrieved record.

The extracted image may be embedded, step 880, in a video game and utilized within the game parameters by the player.

Other steps or series of steps may be used.

Figure 13B:
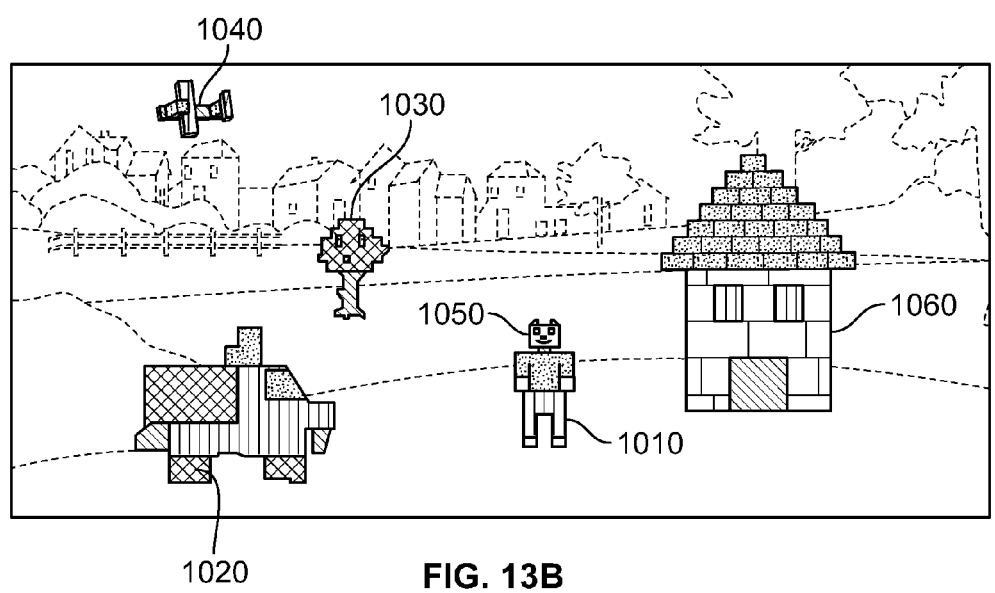
FIG. 13B depicts the assortment of objects of FIG. 13A embedded in a video game.

The extracted image (or multiple extracted images of various physical objects) can be digitally represented on the display device as part of a virtual world, or video game, where the objects inhabiting the virtual world and/or video game, were designed and built from the construction set in the real-world. FIG. 13B depicts the extracted images of the multiple real world objects of FIG. 13A embedded in a computer graphic.

Figure 14:
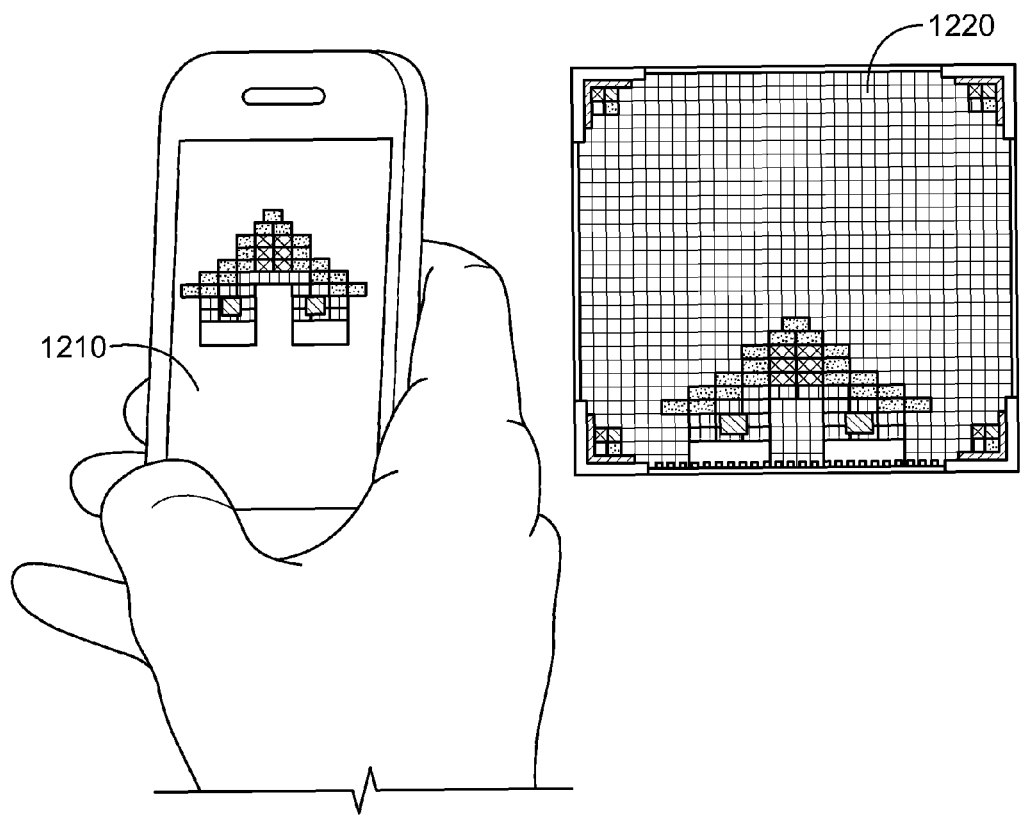
FIG. 14 depicts a representation of a result in accordance with the method of FIG. 2 presented on a handheld mobile device.

FIG. 14 depicts extracted image 1210, after being processed from an image of real world combination 1220 containing an interlocking brick background and object. FIG. 14 depicts extracted image on mobile device 130, 140 equipped with an internal camera.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method for displaying a representation of an arbitrary real-world object in a computer game, comprising:
    capturing an image as a captured image, said captured image including said arbitrary real-world object, said object having been made by a user as a model;
    extracting, from said captured image, an extracted image of said arbitrary real-world object to determine a digital representation of said arbitrary real-world object from extracted image;
    embedding said digital representation of said arbitrary real-world object into a computer graphic of said computer game; and
    manipulating at least one aspect of the embedded digital representation of said arbitrary real-world object within game parameters of said computer game.

2. The method as in claim 1 comprising instructing a user to build said arbitrary real-world object as a model.

3. The method as in claim 2, wherein said model is selected from the group consisting of a character, a tree, a house, a car and an airplane.

4. The method of claim 1 wherein said at least one aspect of the embedded digital representation of said arbitrary real-world object comprises a location of the embedded digital representation of said arbitrary real-world object in the computer graphic of the computer game.

5. The method of claim 1 wherein said capturing of said image uses a digital imaging device in a computing device, and wherein said computer graphic of the computer game is rendered on a display of said computing device.

6. The method of claim 5 wherein the computing device is selected from the group comprising:
    a notebook; a netbook; a personal digital assistant (PDA), a mobile phone, a tablet computer; and a pad computer.

7. The method of claim 1 further comprising:
    comparing (i) a shape of the arbitrary real-world object with (ii) a stored shape in a database.

8. The method of claim 7 further comprising:
    based on said comparing, determining a rating representing a correspondence between the shape of the arbitrary real-world object and the stored shape.

9. The method of claim 7, further comprising:
    based on said comparing, determining a correspondence between the shape of the arbitrary real-world object and the stored shape.

10. The method of claim 9 wherein said manipulating is based, at least in part, on said correspondence between the shape of the arbitrary real-world object and the stored shape.

11. The method of claim 1 further comprising:
    determining whether said arbitrary real-world object corresponds to an object in a database of objects, wherein said manipulating is based on said determining.

12. The method of claim 1 wherein said extracting uses said object's spatial and morphological features to extract said extracted image from said captured image.

13. A device comprising:
    (a) hardware including memory and at least one processor, and
    (b) non-transitory computer-readable storage media having instructions stored thereon that, when executed, cause said at least one processor to:
        (A) obtain at least one image using a camera, said at least one image including a real-world arbitrary physical object made be a user;
        (B) determine a digital representation of said real-world arbitrary physical object from said at least one image;
        (C) embed said digital representation of said real-world arbitrary physical object into a computer graphic of a computer game; and
        (D) manipulate the embedded digital representation of said arbitrary physical object in the computer graphic of the computer game within game parameters of said computer game.

14. The device of claim 13 wherein said instructions, when executed, manipulate the embedded digital representation of said real-world arbitrary physical object based, at least in part, on a correspondence between a shape of the real-world arbitrary physical object and a stored shape.

15. The device of claim 13 wherein the device is selected from the group comprising: a notebook; a netbook, a personal digital assistant (PDA), a mobile phone, a tablet computer; and a pad computer.

16. An article of manufacture, comprising non-transitory computer-readable tangible media having computer readable instructions stored thereon that when executed on a processor, cause the processor to:
    (A) obtain at least one image, said at least one image including a real-world arbitrary physical object made be a user as a model;
    (B) determine a digital representation of said real-world arbitrary physical object from said at least one image obtained in (A);
    (C) embed said digital representation of said real-world arbitrary physical object into a computer graphic of a computer game; and then
    (D) manipulate the embedded digital representation of the real-world arbitrary physical object on the computer graphic of the computer game within game parameters of said computer game.

17. The article of manufacture of claim 16 wherein said manipulating in (D) is based, at least in part, on a correspondence between a shape of the real-world arbitrary physical object and a stored shape.

\* \* \* \* \*